(12) United States Patent
Eriksson et al.

(10) Patent No.: US 11,654,495 B2
(45) Date of Patent: May 23, 2023

(54) CUTTING INSERT FOR A SHOULDER MILLING TOOL

(71) Applicant: AB SANDVIK COROMANT, Sandviken (SE)

(72) Inventors: Thomas Eriksson, Falun (SE); Jorgen Jansson Udd, Gavle (SE); Stefan Roman, Valbo (SE)

(73) Assignee: AB SANDVIK COROMANT, Sandviken (SE)

( * ) Notice: Subject to any disclaimer, the term of this patent is extended or adjusted under 35 U.S.C. 154(b) by 46 days.

(21) Appl. No.: 16/982,625

(22) PCT Filed: Dec. 10, 2018

(86) PCT No.: PCT/EP2018/084145
§ 371 (c)(1),
(2) Date: Sep. 21, 2020

(87) PCT Pub. No.: WO2019/179647
PCT Pub. Date: Sep. 26, 2019

(65) Prior Publication Data
US 2021/0023634 A1 Jan. 28, 2021

(30) Foreign Application Priority Data
Mar. 22, 2018 (EP) .................... 18163292

(51) Int. Cl.
*B23C 5/20* (2006.01)

(52) U.S. Cl.
CPC ........ *B23C 5/205* (2013.01); *B23C 2200/208* (2013.01); *B23C 2200/326* (2013.01)

(58) Field of Classification Search
CPC ............. B23C 5/205; B23C 2200/0411; B23C 2200/086; B23C 2200/201;
(Continued)

(56) References Cited

U.S. PATENT DOCUMENTS 5,807,031 A 9/1998 Arai et al.
2002/0136611 A1 9/2002 Hartlohner
(Continued)

FOREIGN PATENT DOCUMENTS

CN 1104139 A 6/1995
CN 1137960 A 12/1996
(Continued)

*Primary Examiner* — Alan Snyder
(74) *Attorney, Agent, or Firm* — Corinne R. Gorski (57) ABSTRACT

A trigonal cutting insert for a shoulder milling tool includes an upper side, an opposite lower side and a peripheral side surface. A plurality of indexable cutting edges extend along corners of the cutting insert, each cutting edge having a main cutting edge, a corner cutting edge, and a surface-wiping secondary cutting edge. The upper side includes a recessed central surface, and a plurality of positively inclined rake surfaces having a main rake surface portion, a corner rake surface portion, and a secondary rake surface portion. A concave indentation is formed in the corner rake surface portion and in at least an initial part of the main rake surface portion adjacent to the corner rake surface portion, wherein the concave indentation has an elongated shape.

16 Claims, 5 Drawing Sheets

(58) Field of Classification Search
CPC ........ B23C 2200/208; B23C 2200/243; B23C 2200/291; B23C 2200/326; B23C 2200/366
See application file for complete search history.

(56) References Cited

U.S. PATENT DOCUMENTS

| | | |
|---|---|---|
| 2007/0071559 A1 | 3/2007 | Koskinen |
| 2014/0010605 A1 | 1/2014 | Smilovici et al. |
| 2016/0256941 A1 | 9/2016 | Brunetto |

FOREIGN PATENT DOCUMENTS

| | | | | |
|---|---|---|---|---|
| CN | 1557594 | A | 12/2004 | |
| CN | 104395024 | A | 3/2015 | |
| CN | 106475584 | A | 3/2017 | |
| EP | 2977136 | A1 | 1/2016 | |
| GB | 2298600 | A * | 9/1996 | ............. B23C 5/202 |
| JP | H08243829 | A | 9/1996 | |
| JP | H08300214 | A | 11/1996 | |
| JP | H08323510 | A | 12/1996 | |
| JP | H09103909 | A | 4/1997 | |
| JP | 2004291099 | A | 10/2004 | |
| WO | 98/01253 | A1 | 1/1998 | |
| WO | 2006091141 | A1 | 8/2006 | |
| WO | WO-2006091141 | A1 * | 8/2006 | ........... B23B 27/145 |
| WO | 2014006609 | A1 | 1/2014 | |
| WO | WO-2014006609 | A1 * | 1/2014 | ............... B23B 5/20 |
| WO | 2015117733 | A1 | 8/2015 | |
| WO | WO-2018070058 | A1 * | 4/2018 | ........... B23B 27/143 |

* cited by examiner

CUTTING INSERT FOR A SHOULDER MILLING TOOL

RELATED APPLICATION DATA

This application is a § 371 National Stage Application of PCT International Application No. PCT/EP2018/084145 filed Dec. 10, 2018 claiming priority to EP 18163292.8 filed Mar. 22, 2018.

TECHNICAL FIELD OF THE INVENTION

The present invention relates to a cutting insert for a shoulder milling tool and a shoulder milling tool comprising having such a cutting insert.

BACKGROUND OF THE INVENTION AND PRIOR ART

During chip-removing machining of a workpiece, such as during shoulder milling using a milling tool, it is important that chips formed by an active cutting edge of the milling tool are properly evacuated from the cutting zone. If the chips get stuck or otherwise obstructed, they may damage the milling tool and/or the workpiece.

US2007/0071559 discloses a cutting insert for a shoulder milling tool. The cutting insert is double-sided and has a trigonal shape with three indexable cutting edges distributed around each of the identical upper and lower sides of the cutting insert. A central surface on the upper side is recessed with respect to corner cutting edges and secondary cutting edges of the cutting insert, while as main cutting edges intersect a plane defined by the central surface. To give the main cutting edge a positive rake angle, a recess is formed in the central surface along the main cutting edge, at a relatively large cutting depth.

A problem associated with this type of cutting inserts for shoulder milling is that chips formed by the active main cutting edge may get clamped between a clearance surface of the cutting insert and a machined surface of the workpiece. The chips may also jam on the inactive cutting edge, which protrudes with respect to the central surface of the cutting insert. As mentioned above, chips that get clamped or jam may cause damages on the cutting insert and/or on the workpiece. Relatively low feed rates are often used to avoid this problem.

SUMMARY OF THE INVENTION

It would be desirable to provide a cutting insert for a shoulder milling tool by means of which the above mentioned problem can be overcome or at least alleviated. Thus, a primary objective of the present invention is to provide a cutting insert for a shoulder milling tool that provides for a chip flow with a reduced risk that chips jam on an inactive cutting edge, and/or that chips get clamped between a workpiece and the cutting insert, in particular at small cutting depths. Hence, the present invention aims at achieving a controlled chip flow or chip evacuation at small cutting depths in the shoulder milling tool.

According to a first aspect of the invention, at least the primary objective is achieved by means of the initially defined cutting insert for a shoulder milling tool. The cutting insert has a trigonal basic shape and comprises:

an upper side defining an upper extension plane,
a lower side opposite to the upper side defining a lower extension plane, wherein a centre axis extends perpendicularly through the upper and lower extension planes,
a peripheral side surface extending between the upper side and the lower side,
a plurality of indexable cutting edges formed in a transition between the upper side and the peripheral side surface, each indexable cutting edge, as seen in a top view, extending along a corner of the cutting insert, wherein each indexable cutting edge comprises a main cutting edge, a corner cutting edge, and a surface-wiping secondary cutting edge, wherein the main cutting edge adjoins to the corner cutting edge, and the corner cutting edge adjoins to the surface-wiping secondary cutting edge The upper side comprises:
a central surface which is recessed with respect to the plurality of indexable cutting edges,
a plurality of positively inclined rake surfaces extending inside the plurality of indexable cutting edges toward the central surface, each inclined rake surface comprising a main rake surface portion extending inside the main cutting edge, a corner rake surface portion extending inside the corner cutting edge, and a secondary rake surface portion extending inside the surface-wiping secondary cutting edge,
wherein a concave indentation is formed in the corner rake surface portion and in at least an initial part of the main rake surface portion adjacent to the corner rake surface portion of at least one of the inclined rake surfaces, wherein the concave indentation has an elongated shape.

By the smoothly rounded concave indentation, it is possible to control the radius of curvature of the chips formed during machining. In particular, this is the case for small cutting depths and high feeds per tooth, generating relatively thick and narrow chips, since the concave indentation is located in the corner rake surface portion and in the adjacent initial part of the main rake surface portion. At small cutting depths, the formed chips obtain a relatively small radius of curvature by the concave indentation. The formed chip is simultaneously directed in an axial direction of the milling tool, parallel with the main cutting edge. While the chip travels in the axial direction within the concave indentation, it obtains a desired helical shape. Since the cutting insert is trigonal with three cutting edges located around right-angled or essentially right-angled corners of the cutting insert, the cutting insert also has three obtuse-angled corners, each located between two right-angled corners. The formed chips are directed along the active main cutting edge toward such an obtuse-angled corner, where it is evacuated from the cutting insert and the shoulder milling tool. The risk of damaging the inactive cutting edge located at the adjacent right-angled corner is thereby reduced. Furthermore, the protection of cutting edges extending around the lower side is improved since the shape and direction of the chip is controlled.

The chip forming concave indentation provides improved chip formation and also enhances chip evacuation by preventing chip jamming and/or clamping at relatively small cutting depths, such as at below 7 mm, e.g. at approximately 2 mm, where the corner cutting edge and the initial part of the main cutting edge, adjacent to the corner cutting edge, is in engagement with the workpiece. Typically, the concave indentation has a particularly positive effect on the chip formation when the cutting depth is such that a major part of the chip is cut by the corner cutting edge. At larger cutting depths, the concave indentation has a smaller impact on chip forming and chip evacuation. In other words, the concave indentation on one hand provides nicely curled helical chips at small cutting depths and high feeds per tooth, and on the other hand promotes axial chip evacuation. In this way, the risk that chips are caught by the adjacent raised inactive cutting edge, or clamped between the side surface of the cutting insert and a machined wall of the workpiece, is significantly reduced.

Due to the concave indentation, an angle of inclination of the rake surface within the concave indentation, as measured in a section taken perpendicularly to the cutting edge, initially decreases in a direction away from the cutting edge. In other words, the actual inclination of the rake surface within the concave indentation is relatively larger close to the cutting edge and decreases when moving toward the central surface. The angle of inclination may thereafter increase again. The chip is thereby rapidly deflected as it moves into the concave indentation.

The initial part of the main cutting edge may be understood as a part of the main cutting edge that may be in cutting engagement with the workpiece together with the corner cutting edge, so that chips removed by the cutting edge are primarily removed by the corner cutting edge and not by the main cutting edge. The concave indentation may extend further along the main cutting edge, but the intended effect for small cutting depths is achieved with the concave indentation extending along the initial part thereof.

The cutting insert is configured to be fixed in a seat of a shoulder milling tool for cutting a 90° shoulder in a workpiece, but a shoulder milling tool can also be used for ramping and plunge milling including a feed in an axial direction of the shoulder milling tool into the workpiece. The main cutting edge is extending in the axial direction of the shoulder milling tool and is configured for cutting the 90° shoulder or wall in the workpiece, in relation to the surface-wiping secondary cutting edge, which is extending in the radial direction of the shoulder milling tool and configured for surface-wiping the workpiece surface extending perpendicularly to the axial direction of the shoulder milling tool. The trigonal shape of the cutting insert for the shoulder milling tool may hereby provide three indexable (and identical) cutting edges extending along the intersection between the upper side and the peripheral side surface, each of the three indexable cutting edges extending along a right-angled (90°) corner of the cutting insert, wherein three further indexable cutting edges may also extend along an intersection between the lower side and the peripheral side surface. In other words, a double-sided and indexable trigonally shaped cutting insert can advantageously provide a total of six indexable cutting edges to be used for shoulder milling (including ramping/plunge milling).

According to an embodiment, a bisector of the corner cutting edge divides the concave indentation into a major portion and a minor portion, wherein the major portion is larger than the minor portion and extends in the corner rake surface portion and into the initial part of the main rake surface portion, and wherein the minor portion extends only in the corner rake surface portion. Thus, in this embodiment, the concave indentation does not extend into the secondary rake surface portion. It is thereby ensured that the concave indentation is sufficiently narrow to form helical chips at small cutting depths and direct them in an axial direction of the milling tool.

According to an embodiment, the upper side further comprises primary lands extending between the indexable cutting edges and the inclined rake surfaces. The cutting edge is thereby strengthened.

According to an embodiment, at least one of the primary lands has a width that varies along the cutting edge. Preferably, all primary lands are configured in this way. By varying the width, the chip formation can be enhanced. The width of the primary land is herein understood to be measured in a direction which is perpendicular to the cutting edge inside of which the primary land extends, and parallel with the primary land.

According to an embodiment, the width of the primary land is smaller inside the corner cutting edge than inside at least a part of the main cutting edge. Chip formation and chip evacuation are further enhanced when the concave indentation is combined with the narrower primary land along the corner cutting edge, since the chips hereby reach the concave indentation faster at small cutting depths.

According to an embodiment, the width of the primary land inside the main cutting edge increases in a direction away from the corner cutting edge. For example, the width of the primary land may be smaller inside the main cutting edge and along the concave indentation than further away from the corner cutting edge, i.e. at larger cutting depths. Thus, the cutting edge can be tailored for strength at larger cutting depths and for chip formation at smaller cutting depths.

According to an embodiment, an angle of inclination of the primary land with respect to the upper extension plane $P_U$, as measured in a section perpendicular to the cutting edge, varies in dependence on the width of the primary land. The angle of inclination may be smaller inside the corner cutting edge, where the width of the primary land is relatively small, than inside at least the part of the main cutting edge where the width of the primary land is larger. By the smaller angle of inclination, the strength of the cutting edge is improved so as to compensate for the reduced width of the primary land. A significant improvement is that controlled chip forming can be achieved with higher feed rates than with a primary land of constant width and angle of inclination. The angle of inclination of the primary land may also be negative inside the corner cutting edge and neutral or slightly positive inside the main cutting edge. Alternatively, the width of the primary land may be larger inside the corner cutting edge and the angle of inclination consequently larger, such as to more easily direct the chips into the concave indentation.

According to one embodiment, the concave indentation has a relatively larger width in the corner rake surface portion than in the main rake surface portion. The width of the concave indentation is herein to be understood as projected onto the upper extension plane, i.e. as measured in a top view in a direction perpendicular to the cutting edge. In this case, the width of the concave indentation may vary with a correspondingly measured width of the rake surface, which is typically larger inside the corner cutting edge. The largest width of the concave indentation may e.g. be 0.2-1 mm, such as 0.3-0.7 mm, depending on the configuration of the cutting insert.

According to one embodiment, the width of the concave indentation successively decreases from a largest width in the corner rake surface portion to a smallest width in the main rake surface portion.

According to an embodiment, the concave indentation has a main extension parallel with or essentially parallel with the main cutting edge, so as to promote chip formation and evacuation in an axial direction of the milling tool. The concave indentation may extend to a position along the main cutting edge corresponding to a cutting depth at which a chip formed by the cutting edge is primarily formed by the main cutting edge. Thereby, the beneficial effects of the concave indentation for small cutting depths, and chips primarily formed by the corner cutting edge, are achieved.

According to one embodiment, the concave indentation comprises three regions of equal length, of which regions a first end region extends in the main rake surface portion, a second end region extends in the corner rake surface portion and a third intermediate region extends between the first end region and the second end region, across an intersection between the main rake surface portion and the corner rake surface portion. The length of the concave indentation is herein measured in a top view along a curve extending in parallel with the cutting edge. Beneficial effects on the chip formation at relatively small cutting depths may thereby be achieved.

According to one embodiment, a depth of the concave indentation successively increases in the first and second end regions toward the third intermediate region.

According to one embodiment, the concave indentation has its largest depth in the third intermediate region. Preferably, the largest depth is located closer to the first end region than to the second end region. The largest depth of the concave indentation may e.g. be less than 0.1 mm, such as within the range 0.01-0.05 mm. A significant effect on chip formation is noted already for such small depths.

According to one embodiment, as seen in sections taken perpendicularly to the cutting edge, the concave indentation has a curvature that varies along the cutting edge, wherein the concave indentation has its largest curvature in the third intermediate region, i.e. relatively close to the intersection between the main rake surface portion and the corner rake surface portion. The curvature may preferably be largest in an area between a bisector of the corner cutting edge and the intersection between the main rake surface portion and the corner rake surface portion, or closer to the intersection between the main rake surface portion and the corner rake surface portion than to the bisector. The concave indentation consequently has its smallest radius of curvature in the same area. Thus, the concave indentation is in this embodiment deeper and has a smaller width in the third intermediate region. This is beneficial for the chip formation at small cutting depths.

According to an embodiment, a smooth transition is formed between the concave indentation and neighbouring parts of the rake surface portions. The smooth transition is beneficial for achieving a smooth chip formation and chip evacuation, and consequently less wear.

According to an embodiment, the upper side further comprises inclined transition surfaces extending from the rake surfaces toward the central surface. The rake surface may preferably have a relatively small angle of inclination when compared to the transition surfaces, so that the central surface, which functions as a support surface when the cutting insert is mounted in an insert seat of a tool body, becomes as large as possible.

According to a further aspect of the invention, a shoulder milling tool is provided, wherein the shoulder milling tool comprises a tool body being provided with an insert seat for receiving a cutting insert, wherein the shoulder milling tool comprises the cutting insert according to any one of the embodiments discussed herein arranged in the insert seat. Advantages and advantageous features of such a shoulder milling tool appear from the above description of the cutting insert.

Further advantageous features and advantages of the invention will appear from the following detailed description.

BRIEF DESCRIPTION OF THE DRAWINGS

Embodiments of the invention will in the following be described by means of example with reference to the appended drawings, in which.

DETAILED DESCRIPTION OF EMBODIMENTS OF THE INVENTION

Figure 1:
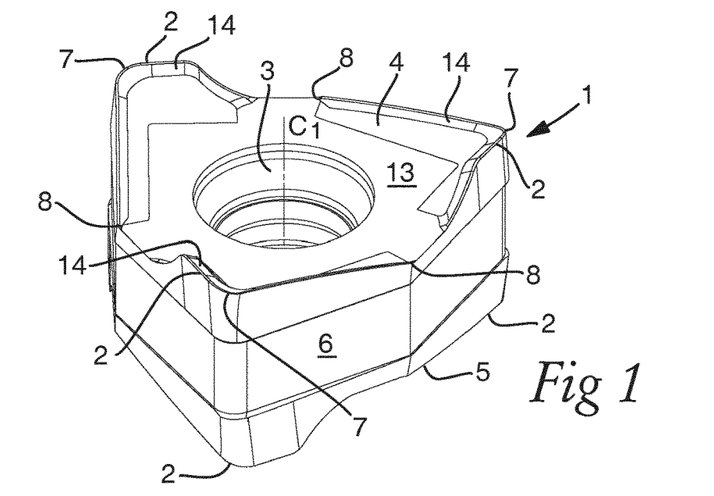
FIG. 1 shows a perspective view of a cutting insert according to an embodiment of the invention.
Figure 2:
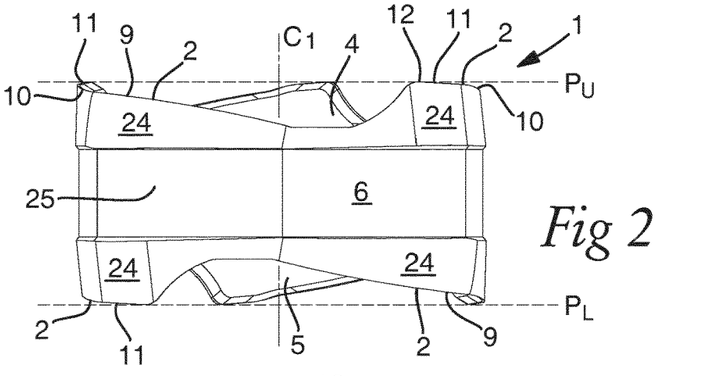
FIG. 2 shows a side view of the cutting insert in FIG. 1.
Figure 3:
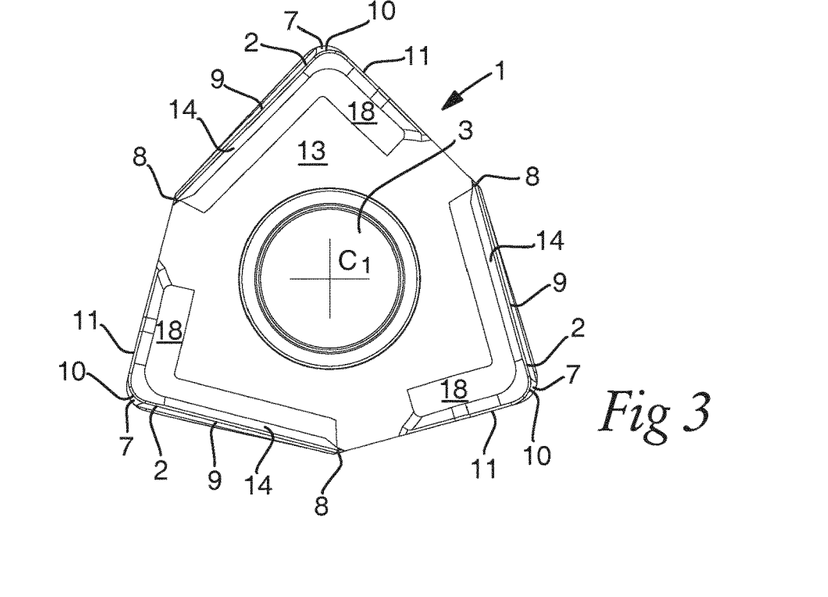
FIG. 3 shows a top view of the cutting insert in FIG. 1.

A cutting insert 1 according to an embodiment of the invention is illustrated in FIGS. 1-3, and in further detail in FIGS. 4-7.

Figure 8:
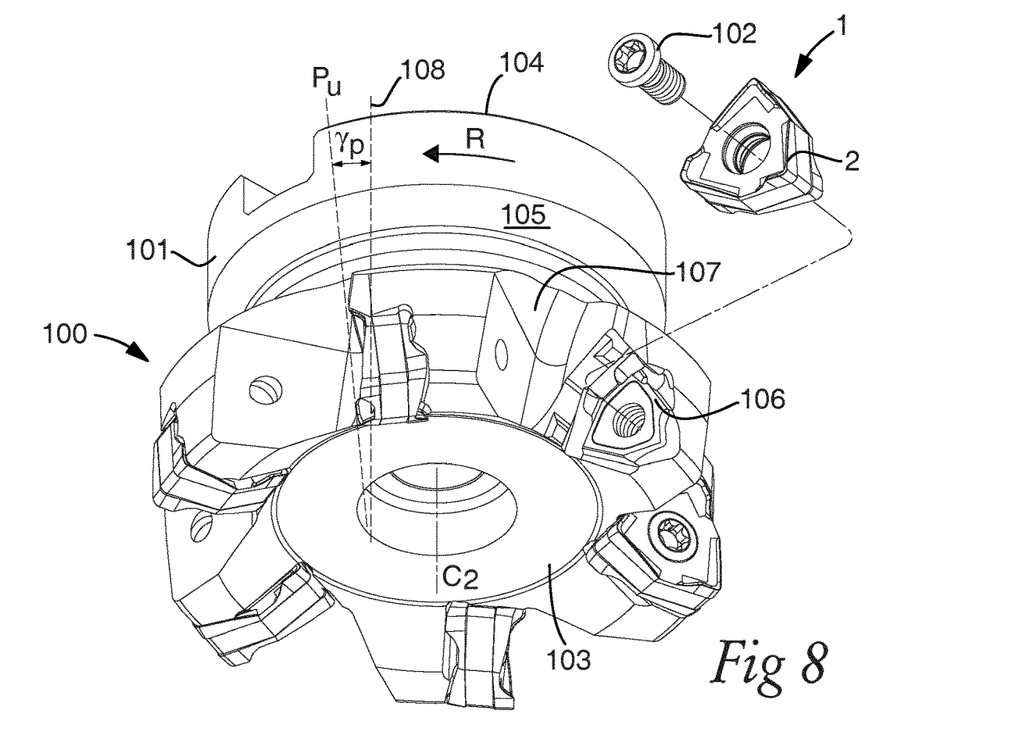
FIG. 8 shows a perspective view of a shoulder milling tool according to an embodiment of the invention.
Figure 9:
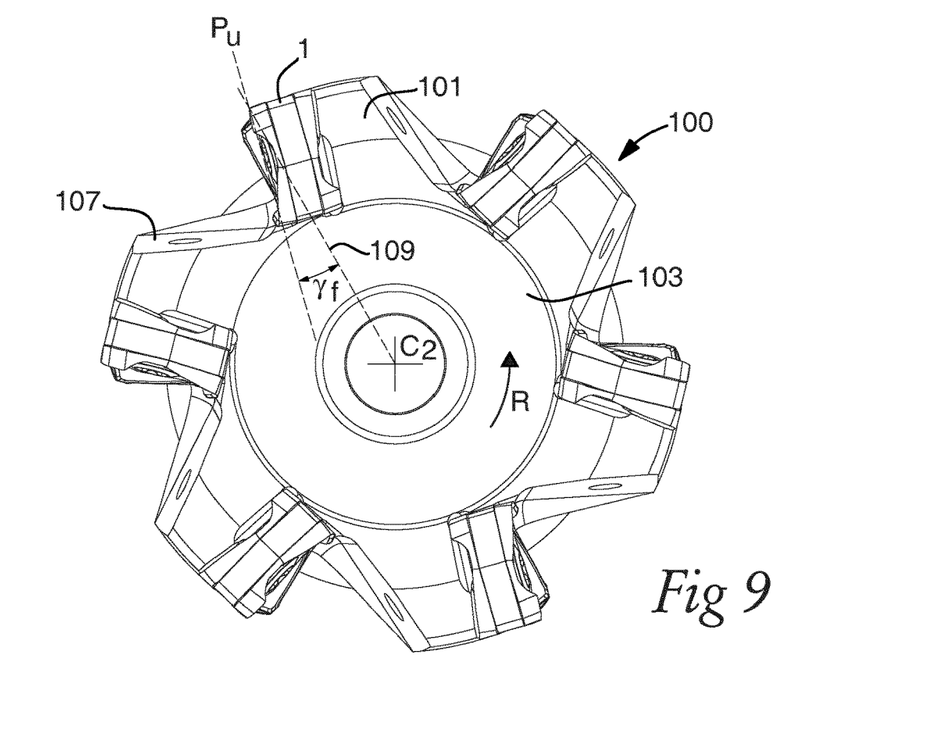
FIG. 9 shows an end view of the shoulder milling tool in FIG. 8.

The cutting insert 1 is configured for use in a shoulder milling tool 100 as shown in FIGS. 8-9. However, the cutting insert 1 may also be used for ramping or plunge milling. The cutting insert 1 is double-sided and six times indexable, i.e. the cutting insert 1 comprises six identical cutting edges 2 in total, such that the cutting insert 1 can be mounted in six different index positions in an insert seat of the shoulder milling tool 100, to provide one active cutting edge at a time for milling a workpiece. The cutting insert 1 comprises a through hole 3 for screw mounting the cutting insert to the shoulder milling tool, the through hole 3 extending centrally through the cutting insert. The cutting insert is preferably manufactured from a cemented carbide material, but it may be manufactured from a material comprising e.g. one or more of ceramics, cubic boron nitride, polycrystalline diamond, and/or cermet. The cutting insert is also preferably coated with surface coatings such as e.g. titanium nitride, titanium carbonitride, and/or aluminium oxide.

The cutting insert 1 has a trigonal shape with an upper side 4 defining an upper extension plane $P_U$ and an identical lower side 5, opposite to the upper side 4, defining a lower extension plane $P_L$. A centre axis $C_1$ extends perpendicularly through the upper and lower extension planes $P_U$, $P_L$. A peripheral side surface 6 extends between the upper side 4 and the lower side 5. Since the upper side 4 and the lower side 5 are identical, only the upper side will be described in detail.

Seen in a top view toward the upper extension plane $P_U$, the trigonal shape has three 90° corners 7, along which the cutting edges 2 extend, and three 150° corners 8 formed between the 90° corners 7.

The actual angles of a cutting insert may vary due to manufacturing tolerances. The surfaces are formed in pressing and sintering operations in the manufacturing of the cutting insert, wherein some surfaces are ground after the sintering operation.

Thus, angles between surfaces, edges, and/or planes may have different manufacturing tolerances. In practice, the actual angles of the actual cutting insert may depend on manufacturing tolerances, a particular selected layout of the cutting insert and shoulder milling tool, and/or a specific part of the cutting insert requiring stricter manufacturing tolerances involving relatively small angles. Hence, in some cases, the actual angle may vary a few degrees from the number given, such as ±3° or ±1°. Accordingly, the above mentioned 90° corner 7 may be considered as an approximately 90° corner encompassing actual corner angles within a range of 87-93°, preferably 89-91°, and the (approximately) 150° corners 8 may encompass corner angles within a range of 147-153°, preferably 149-151°.

Three indexable cutting edges 2 are formed in a transition between the upper side 4 and the peripheral side surface 6. Each indexable cutting edge 2, as seen in a top view, extends along a 90° corner 7 of the cutting insert 2 and comprises a main cutting edge 9, a corner cutting edge 10, and a surface-wiping secondary cutting edge 11. The main cutting edge 9 adjoins to the corner cutting edge 10, which in turn adjoins to the surface-wiping secondary cutting edge 11. The main cutting edge 9 slopes downward from the corner cutting edge 10 and is slightly rounded with a convex shape as seen in the side view in FIG. 2. The main cutting edge 9 is inclined in relation to the upper extension plane $P_U$ such that a distance to the upper extension plane $P_U$ increases in a direction away from the corner cutting edge 10. This provides a positive inclination of the main cutting edge 9, whereby the main cutting edge 9 can first engage with a workpiece closest to the corner cutting edge 10 and thereafter gradually enter with the remaining parts of the main cutting edge 9 to provide a smooth cutting action. The positive inclination on the main cutting edge 9 furthermore provides an axial force component on the chips for achieving an axial chip evacuation also at relatively larger cutting depths. The main cutting edge 9 may e.g. extend at an average angle within a range of 6-14° to the upper extension plane $P_U$, or at an average angle within a range of 9-11° to the upper extension plane $P_U$.

The corner cutting edge 10 in turn slopes downward from the surface-wiping secondary cutting edge 11 toward the main cutting edge 9. The surface-wiping secondary cutting edge 11 slopes downward toward the corner cutting edge 10 from a highest point 12 of the cutting insert, located in the upper extension plane $P_U$.

Figure 4:
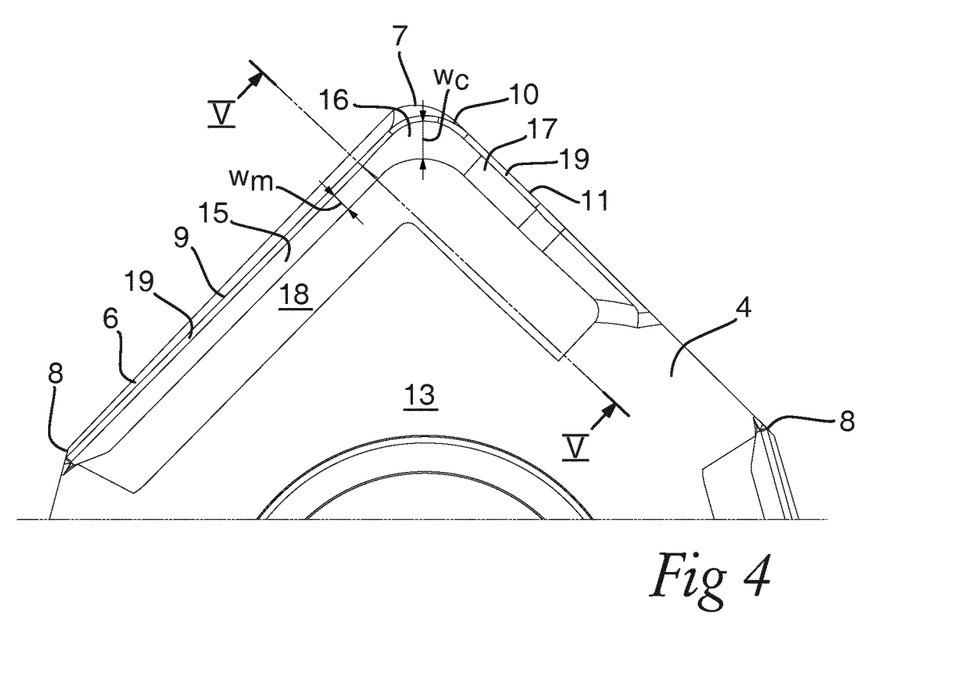
FIG. 4 shows a detail from FIG. 3.
Figure 5:
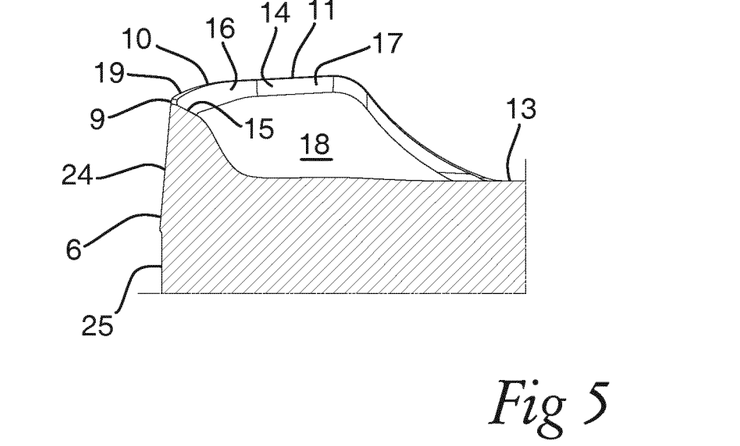
FIG. 5 shows a section along the line V-V in FIG. 4.

The upper side 4 comprises a flat central surface 13 which is recessed with respect to the plurality of indexable cutting edges 2 and the upper extension plane $P_U$. The upper side 4 further comprises a plurality of positively inclined rake surfaces 14, each rake surface 14 extending inside one of the indexable cutting edges 2. The rake surfaces 14 slope downward toward the central surface 13 and thus have a positive inclination. Each inclined rake surface 14 comprises, as seen in FIGS. 4-5, a main rake surface portion 15 extending inside the main cutting edge 9, a corner rake surface portion 16 extending inside the corner cutting edge 10, and a secondary rake surface portion 17 extending inside the surface-wiping secondary cutting edge 11. A width $w_c$ of the corner rake surface portion 16, as measured in a top view in a direction perpendicular to the cutting edge 2, i.e. projected onto the upper extension plane $P_U$, is larger than a correspondingly measured width $w_m$ of the main rake surface portion 15.

The rake surfaces 14 are elevated with respect to the central surface 13, and a plurality of positively inclined transition surfaces 18 connect the rake surfaces 14 and the central surface 13. Primary lands 19 extend between the indexable cutting edges 2 and the rake surfaces 14.

Figure 6:
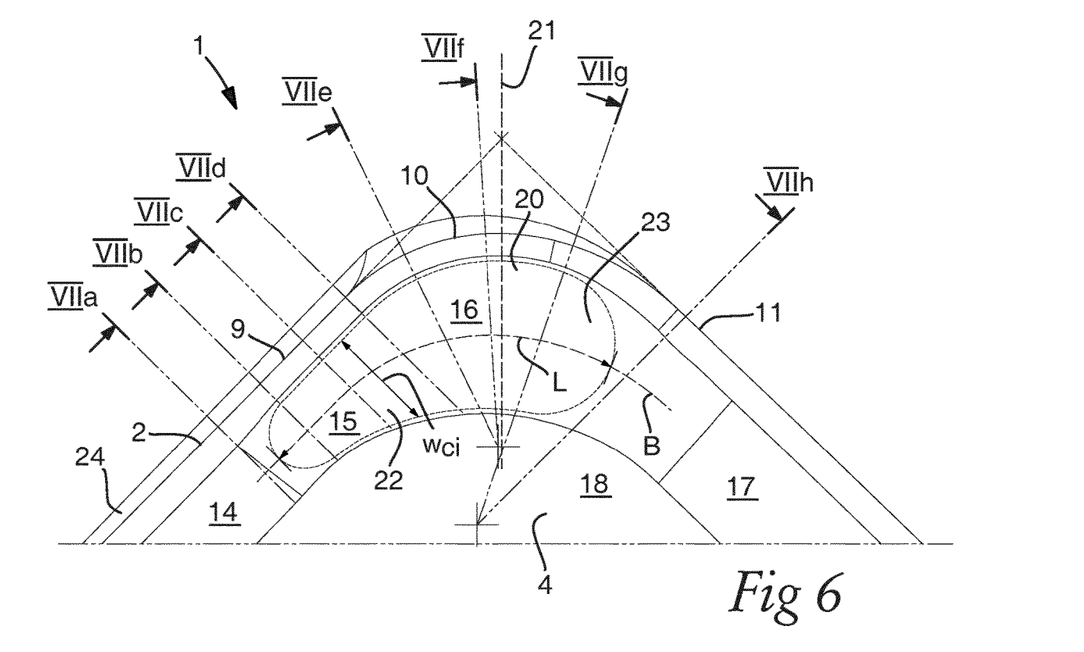
FIG. 6 shows a detail from FIG. 4, FIG. 7a-h show sections along the lines marked in FIG. 6.

In each inclined rake surface 14, a concave indentation 20 is formed as schematically marked in FIG. 6, wherein an extension of the concave indentation 20 is indicated using a dashed line. The concave indentation 20 extends in the corner rake surface portion 16 and in an initial part of the main rake surface portion 15, adjacent to the corner rake surface portion 16. The concave indentation 20 has an elongated shape with a curvature that varies along the cutting edge 2. It is smoothly rounded without sharp edges or corners. A width $w_{ci}$ of the concave indentation 20, as measured in a top view in a direction perpendicular to the cutting edge 2, varies along the cutting edge 2, with the concave indentation 20 having a larger width in the relatively wide corner rake surface portion 16 than in the narrower main rake surface portion 15. Generally, the largest width of the concave indentation is similar to the width of the rake surface 14 in which it extends. The concave indentation 20 has a length L as measured along a curve B extending in parallel with the cutting edge 2.

FIGS. 7a-h show sectional views along the lines indicated in FIG. 6, which sectional views indicate the extension of the concave indentation 20. For clarity, the sectional views show only the sections, and not parts of the cutting insert 2 located behind the sections. The horizontal dashed lines are parallel with the upper extension plane $P_U$, while the inclined dashed lines indicate a general slope α of the rake surface 14 in the sectional view.

Figure 7A:
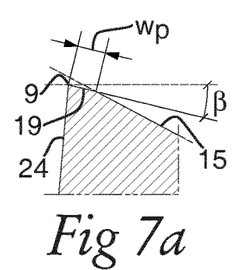
Figure 7B:
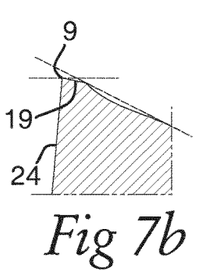
Figure 7C:
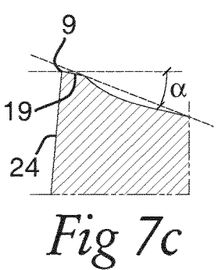
Figure 7D:
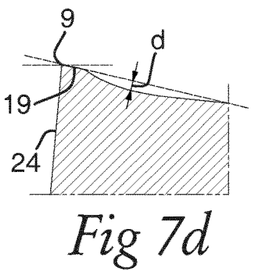
Figure 7E:
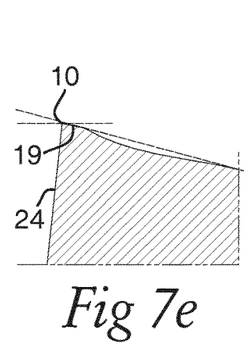
Figure 7F:
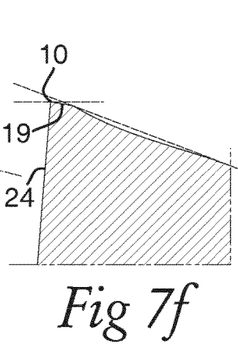
Figures 7G, 7H:
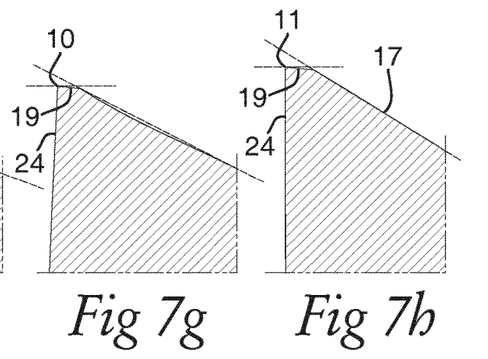

The depth d of the concave indentation, when measured with respect to the indicated general slope a of the rake surface 14 and in a direction perpendicular to the general slope α, is relatively large at an intersection of the corner rake surface portion 16 and the main rake surface portion 15, i.e. in the section seen in FIG. 7d. In the shown embodiment, the largest depth d is approximately 0.02 mm. From this intersection, the depth d decreases in the corner rake surface portion 16 as well as in the main rake surface portion 15, while the general slope α of the rake surface 14 increases. Due to the concave indentation 20, an actual angle of inclination also varies in a direction transverse to the cutting edge 2, wherein the actual angle of inclination is measured in a sectional view between a tangent to the rake surface 14 within the concave indentation 20 and a plane parallel with the upper extension plane $P_U$. Generally, the actual angle of inclination initially decreases in a direction away from the cutting edge 2. The concave indentation is also relatively wide and shallow in the corner rake surface portion 16 when compared to the main rake surface portion 15.

In the shown embodiment, a bisector 21 of the corner cutting edge, i.e. a line drawn at a 45° angle to the main cutting edge 9 as well as to the surface-wiping secondary cutting edge 11, divides the concave indentation 20 into a major portion 22 and a minor portion 23. The major portion 22 is larger than the minor portion 23 and extends in the corner rake surface portion 16 and into the initial part of the main rake surface portion 15. The minor portion 23 extends only in the corner rake surface portion 16. In other words, the concave indentation 20 does not extend into the secondary rake surface portion 17. During machining, chips cut at a small cutting depth by the corner cutting edge 10 and the adjacent initial part of the main cutting edge 9 are therefore deflected in an axial direction of the milling tool 100 before reaching the secondary rake surface portion 17. As measured along the curve B, a length of the major portion 22 is in the shown embodiment approximately twice a length of the minor portion 23. Preferably, the length of the major portion 22 is 1.5-4 times the length of the minor portion.

The primary land 19 has a width $w_p$ in a direction perpendicular to the cutting edge 2, in this case measured parallel to the primary land 19, which width $w_p$ is smaller inside the corner cutting edge 10 than inside the surface-wiping secondary cutting 11 edge and inside at least a part of the main cutting edge 9, which is not immediately adjacent to the corner cutting edge 10. The width $w_p$ of the primary land 19 inside the main cutting edge 9 increases in a direction away from the corner cutting edge 10, e.g. from approximately 0.080 mm inside the corner cutting edge 10 to approximately 0.10 mm inside the main cutting edge 9 at a level of the section shown in FIG. 7a. With the smaller width $w_p$ of the primary land 19 inside the corner cutting edge 10 and the adjacent part of the main cutting edge 9, chips formed during machining reaches the concave indentation more quickly.

Simultaneously with the width $w_p$ of the primary land, an angle of inclination β of the primary land 19 varies along the cutting edge 2 such as to compensate for the loss in strength caused by the reduced width of the primary land 19 inside the corner cutting edge 10. As the width $w_p$ of the primary land 19 decreases toward the corner cutting edge 10, the angle of inclination β as measured with respect to the parallel plane $P_U$ therefore also decreases as illustrated in FIGS. 7a-h. In alternative embodiments, the width as well as the angle of inclination of the primary land may be varied differently.

The peripheral side surface 6 comprises a plurality of clearance surfaces 24 and a circumferential waist portion 25 extending midways between the upper and lower sides 4, 5. A main cutting edge 9 of the upper side 4 is arranged on an opposite side of the circumferential waist portion 25 to a surface-wiping secondary cutting edge 11 of the lower side 5, and a surface-wiping secondary cutting edge 11 of the upper side 4 is arranged on an opposite side of the circumferential waist portion 25 to a main cutting edge 9 of the lower side 5. The clearance surfaces 24 above the circumferential waist portion 25 are angled so that sufficient clearance is provided when the cutting insert 1 is mounted in the milling tool 100.

The shoulder milling tool 100 shown in FIGS. 8-9 comprises a tool body 101, several detachable and indexable cutting inserts 1, and fastening members 102 in the form of screws. The shoulder milling tool 100 has a central rotation axis $C_2$ around which the tool body 101 is rotatable in a direction of rotation R. The tool body 101 includes a front end 103 and a rear end 104, and an envelope surface 105 extending between the front end 103 and the rear end 104. In the rear end 104, a coupling interface for coupling the shoulder milling tool 100 to a machine (not shown) is provided.

In a transition between the front end 103 and the envelope surface 105, a number of insert seats 106 are formed in the tool body 101. In the shown embodiment, six insert seats 106 are provided. In front of each insert seat 106 in the direction of rotation R, a chip pocket 107 is provided. A cutting insert 1 is mounted in each insert seat 106 with its lower side 5 facing the insert seat 106. The cutting inserts 1 are mounted in the insert seats 106 by means of the fastening members 102.

Figure 10:
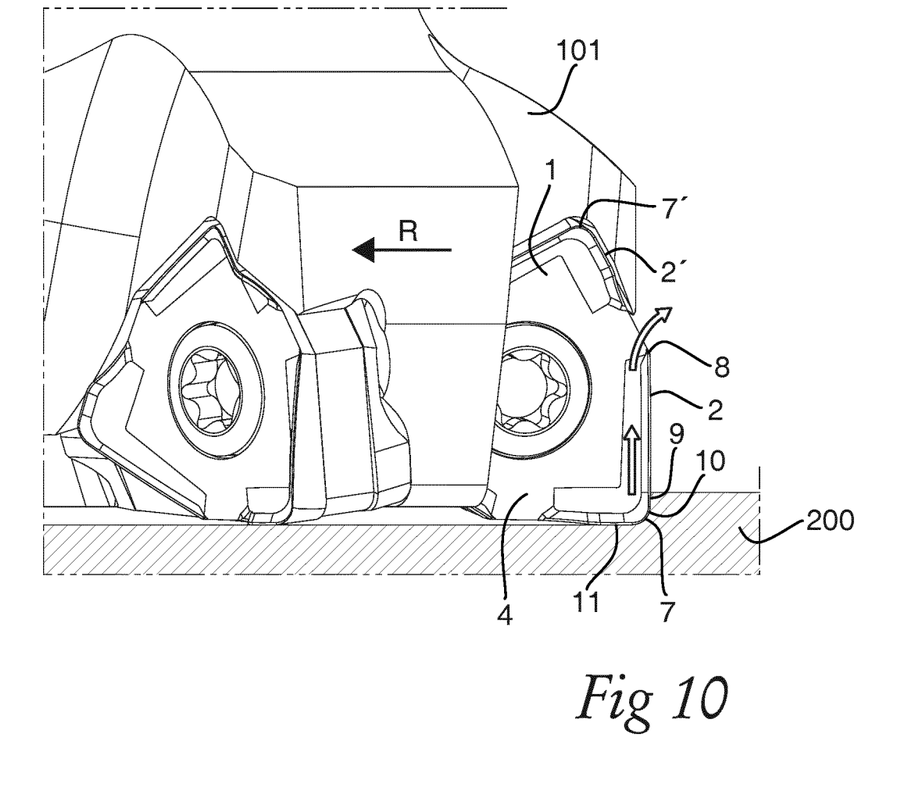
FIG. 10 shows a detail of the shoulder milling tool in FIG. 8.

The cutting insert 1 is mounted for cutting into a workpiece 200 with the main cutting edge 9 extending in the axial direction of the milling tool 100, i.e. along the central rotation axis $C_2$, and the surface-wiping secondary cutting edge 11 extending in the radial direction of the shoulder milling tool as shown in FIG. 10. The shoulder milling tool 100 can also be used for plunge milling, i.e. milling in the axial direction of the shoulder milling tool 100. Mentioned purely as an example, the shoulder milling tool 100 may have a diameter within a range of 32-250 mm. Obviously, the number of insert seats and cutting inserts 1 may vary depending on for instance the diameter of the shoulder milling tool and/or the operating conditions, such as e.g. operational stability, power consumption and workpiece material.

According to the shown embodiment, the insert seat 106 is configured to provide a negative axial rake angle $\gamma_p$ for the upper extension plane $P_U$ of the cutting insert 1 arranged in the insert seat 106. The insert seat 106 is hereby configured to provide a negative axial rake angle $\gamma_p$ within a range of 1-11°, more precisely 4-8°, or of approximately 6°. The negative axial rake angle $\gamma_p$ is measured between the upper extension plane $P_U$ of the cutting insert 1 and a line 108 extending in parallel with the central rotation axis $C_2$ and provides an axial clearance between the clearance surface of the surface-wiping secondary cutting edge 11 and the workpiece during milling.

According to the embodiment, the insert seat 106 is also configured to provide a negative radial rake angle $\gamma_f$ for the upper extension plane $P_U$ of the cutting insert 1 arranged in the insert seat 106. The insert seat 106 is configured to provide a negative radial rake angle $\gamma_f$ within a range of 8-20°, more precisely 11-17°, or of approximately 14°. The negative radial rake angle $\gamma_f$ is measured between the upper extension plane $P_U$ of the cutting insert 1 and a radially extending line 109 from the central rotation axis $C_2$. With the cutting insert shown in FIGS. 1-3, the negative radial rake angle $\gamma_f$ together with the angle of inclination β of the primary land 19 gives rise to an effective angle of the primary land 19 which is neutral inside a major part of the main cutting edge 9 and the surface-wiping secondary cutting edge 11, and which becomes slightly negative inside the corner cutting edge 10 and the part of the main cutting edge 9 which is adjacent to the corner cutting edge 10. This configuration of the primary land may however be different in other embodiments, and the cutting insert may also be made without a primary land for certain applications.

The cutting insert 1 mounted in the milling tool 100 is in FIG. 10 shown in engagement with the workpiece 200 during machining, with an active cutting edge 2 extending around a 90° corner 7 of the cutting insert 1. During machining, in particular at lower cutting depths using the corner cutting edge 10 and an initial adjacent part of the main cutting edge 9, chips removed by the cutting edge 2 are formed by the concave indentation 20 (not visible in this view) so as to obtain a nicely curved helical shape of the chips. As shown by the arrows, the chips are also directed within the concave indentation 20, along the main cutting edge 9 and toward the adjacent 150° corner 8, where the chips may be evacuated without damaging the inactive cutting edge 2' at the adjacent 90° corner 7'.

The invention is of course not limited to the embodiments disclosed, but may be varied and modified within the scope of the following claims.

The invention claimed is:

1. A cutting insert for a shoulder milling tool, the cutting insert having a trigonal basic shape, the cutting insert comprising:
   an upper side defining an upper extension plane;
   a lower side opposite the upper side, the lower side defining a lower extension plane, wherein a center axis extends perpendicularly through the upper and lower extension planes;
   a peripheral side surface extending between the upper side and the lower side;
   a plurality of indexable cutting edges formed in a transition between the upper side and the peripheral side surface, each indexable cutting edge, as seen in a top view, extending along a corner of the cutting insert, wherein each indexable cutting edge includes a main cutting edge, a corner cutting edge, and a surface-wiping secondary cutting edge, wherein the main cutting edge adjoins the corner cutting edge, and the corner cutting edge adjoins the surface-wiping secondary cutting edge, wherein the upper side includes a central surface, which is recessed with respect to the plurality of indexable cutting edges, a plurality of positively inclined rake surfaces extending inside the plurality of indexable cutting edges toward the central surface, each inclined rake surface having a main rake surface portion extending inside the main cutting edge, a corner rake surface portion extending inside the corner cutting edge, and a secondary rake surface portion extending inside the surface-wiping secondary cutting edge, wherein a concave indentation is formed in the corner rake surface portion and in at least an initial part of the main rake surface portion adjacent to the corner rake surface portion of at least one of the inclined rake surfaces, wherein the concave indentation has an elongated shape; and a bisector of the corner cutting edge arranged to divide the concave indentation into a major portion and a minor portion, wherein the major portion is larger than the minor portion and extends in the corner rake surface portion and into the initial part of the main rake surface portion, and wherein the minor portion extends only in the corner rake surface portion, the concave indentation having a largest width in the corner rake surface portion, the largest width of the concave indentation being similar to the width of the respective inclined rake surface in which the concave indentation extends.

2. The cutting insert according to claim 1, wherein the upper side includes primary lands extending between the indexable cutting edges and the inclined rake surfaces.

3. The cutting insert according to claim 2, wherein at least one of the primary lands has a width that varies along the cutting edge.

4. The cutting insert according to claim 3, wherein the width of the primary land is smaller inside the corner cutting edge than inside at least a part of the main cutting edge.

5. The cutting insert according to claim 3, wherein the width of the primary land inside the main cutting edge increases in a direction away from the corner cutting edge.

6. The cutting edge according to claim 3, wherein an angle of inclination of the primary land with respect to the upper extension plane, as measured in a section perpendicular to the cutting edge, varies in dependence on the width of the primary land.

7. The cutting insert according to claim 1, wherein the concave indentation has a relatively larger width in the corner rake surface portion than in the main rake surface portion.

8. The cutting insert according to claim 7, wherein the width of the concave indentation successively decreases from a largest width in the corner rake surface portion to a smallest width in the main rake surface portion.

9. The cutting insert according to claim 1, wherein the concave indentation has a main extension parallel with or essentially parallel with the main cutting edge.

10. The cutting insert according to claim 1, wherein the concave indentation includes three regions of equal length, of which regions a first end region extends in the main rake surface portion, a second end region extends in the corner rake surface portion and a third intermediate region extends between the first end region and the second end region, across an intersection between the main rake surface portion and the corner rake surface portion.

11. The cutting insert according to claim 10, wherein a depth of the concave indentation successively increases in the first and second end regions toward the third intermediate region.

12. The cutting insert according to claim 11, wherein the concave indentation has its largest depth in the third intermediate region.

13. The cutting insert according to claim 10, wherein, as seen in cross-sections taken perpendicularly to the cutting edge, the concave indentation has a curvature that varies along the cutting edge, wherein the concave indentation has its largest curvature in the third intermediate region.

14. The cutting insert according to claim 1, wherein a smooth transition is formed between the concave indentation and neighbouring parts of the rake surface portions.

15. The cutting insert according to claim 1, wherein the upper side includes inclined transition surfaces extending from the rake surfaces toward the central surface.

16. A shoulder milling tool comprising:
a tool body provided with an insert seat; and
a cutting insert according to claim 1 arranged in the insert seat.

* * * * *